United States Patent [19]
Charlebois

(10) Patent No.: US 8,533,358 B2
(45) Date of Patent: Sep. 10, 2013

(54) METHODS AND APPARATUS FOR FRAGMENTING SYSTEM INFORMATION MESSAGES IN WIRELESS NETWORKS

(75) Inventor: Mark Charlebois, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1024 days.

(21) Appl. No.: 11/270,168

(22) Filed: Nov. 8, 2005

(65) Prior Publication Data

US 2007/0104220 A1 May 10, 2007

(51) Int. Cl.
*G06F 15/16* (2006.01)
*H04N 5/445* (2011.01)

(52) U.S. Cl.
USPC ............................................ 709/236; 725/39

(58) Field of Classification Search
USPC .................... 709/236, 230–237; 725/39
See application file for complete search history.

(56) References Cited

U.S. PATENT DOCUMENTS

| | | |
|---|---|---|
| 4,600,921 A | 7/1986 | Thomas |
| 5,491,774 A | 2/1996 | Norris et al. |
| 5,604,528 A | 2/1997 | Edwards et al. |
| 5,652,759 A | 7/1997 | Stringfellow, Jr. |
| 5,659,350 A | 8/1997 | Hendricks et al. |
| 5,696,500 A | 12/1997 | Diem |
| 5,717,923 A | 2/1998 | Dedrick |
| 5,805,763 A * | 9/1998 | Lawler et al. ............ 386/83 |
| 5,978,649 A | 11/1999 | Kahn |
| 6,016,141 A | 1/2000 | Knudson et al. |
| 6,075,526 A | 6/2000 | Rothmuller |
| 6,088,722 A | 7/2000 | Herz et al. |
| 6,122,658 A | 9/2000 | Chaddha |
| 6,230,203 B1 | 5/2001 | Koperda et al. |
| 6,314,573 B1 | 11/2001 | Gordon et al. |
| 6,477,707 B1 | 11/2002 | King et al. |
| 6,505,347 B1 | 1/2003 | Kaneko et al. |
| 6,536,041 B1 * | 3/2003 | Knudson et al. ............ 725/39 |
| 6,614,573 B1 | 9/2003 | Cao |
| 6,654,423 B2 | 11/2003 | Jeong et al. |
| 6,671,853 B1 * | 12/2003 | Burkett et al. ............ 715/235 |
| 6,678,215 B1 | 1/2004 | Treyz et al. |

(Continued)

FOREIGN PATENT DOCUMENTS

| | | |
|---|---|---|
| CA | 2548227 A1 | 6/2005 |
| CN | 1212577 A | 3/1999 |

(Continued)

OTHER PUBLICATIONS

Wong, et al, "Xstream: A Middleware for Streaming XML Contents over Wireless Environments", IEEE Transactions on Software Engineering, vol. 30, No. 12, Dec. 2004, pp. 918-935.*

(Continued)

*Primary Examiner* — Patrice Winder
*Assistant Examiner* — Julian Chang
(74) *Attorney, Agent, or Firm* — The Marbury Law Group, PLLC

(57) ABSTRACT

Methods and apparatus for sending system information (SI) associated with media directed to a device are disclosed. In one embodiment, the method includes the steps of fragmenting system information into a plurality of fragments, and transporting the fragments to a device. I another embodiment, a method for receiving system information associated with media directed to a device includes receiving system information fragments, and reassembling the fragments to recover the system information.

62 Claims, 6 Drawing Sheets

(56) References Cited

U.S. PATENT DOCUMENTS

| | | |
|---|---|---|
| 6,729,929 B1 | 5/2004 | Sayers et al. |
| 6,760,916 B2 | 7/2004 | Holtz et al. |
| 6,785,551 B1 | 8/2004 | Richard |
| 6,857,012 B2 | 2/2005 | Sim et al. |
| 6,863,557 B2 | 3/2005 | Mills et al. |
| 6,886,017 B1 | 4/2005 | Jackson et al. |
| 6,895,486 B1 | 5/2005 | Wong et al. |
| 6,918,132 B2 | 7/2005 | Gargi |
| 6,983,327 B2 | 1/2006 | Koperda et al. |
| 7,003,117 B2 | 2/2006 | Kacker et al. |
| 7,017,174 B1 | 3/2006 | Sheedy |
| 7,043,225 B1 | 5/2006 | Patel et al. |
| 7,093,754 B2 | 8/2006 | Sako |
| 7,117,439 B2 | 10/2006 | Barrett et al. |
| 7,120,932 B2 | 10/2006 | Lockhart et al. |
| 7,149,189 B2 | 12/2006 | Huntington et al. |
| 7,194,756 B2 | 3/2007 | Addington et al. |
| 7,257,634 B2 * | 8/2007 | Colby et al. ............ 709/226 |
| 7,305,074 B2 | 12/2007 | Hartung et al. |
| 7,376,964 B1 * | 5/2008 | Kim ........................ 725/50 |
| 7,386,871 B1 * | 6/2008 | Knudson et al. ............ 725/92 |
| 7,424,708 B2 | 9/2008 | Andersson et al. |
| 7,506,262 B2 | 3/2009 | Gupta et al. |
| 7,565,506 B2 | 7/2009 | Chen et al. |
| 7,600,245 B2 | 10/2009 | Steading et al. |
| 7,620,574 B2 | 11/2009 | Buehl et al. |
| 2001/0037238 A1 | 11/2001 | Gotoh et al. |
| 2001/0052133 A1 | 12/2001 | Pack et al. |
| 2002/0016801 A1 * | 2/2002 | Reiley et al. ............ 707/523 |
| 2002/0024944 A1 * | 2/2002 | Zhang et al. ............ 370/349 |
| 2002/0042915 A1 * | 4/2002 | Kubischta et al. ........ 725/38 |
| 2002/0047894 A1 * | 4/2002 | Steading et al. ............ 348/44 |
| 2002/0054146 A1 | 5/2002 | Fukumoto et al. |
| 2002/0059603 A1 | 5/2002 | Kelts |
| 2002/0124259 A1 | 9/2002 | Chang et al. |
| 2002/0144291 A1 | 10/2002 | Smiley et al. |
| 2002/0157002 A1 | 10/2002 | Messerges et al. |
| 2002/0188663 A1 | 12/2002 | Islam et al. |
| 2002/0194599 A1 | 12/2002 | Mountain |
| 2003/0037331 A1 | 2/2003 | Lee |
| 2003/0040850 A1 | 2/2003 | Najmi et al. |
| 2003/0069881 A1 * | 4/2003 | Huttunen ...................... 707/5 |
| 2003/0072257 A1 | 4/2003 | Ikedo et al. |
| 2003/0100326 A1 | 5/2003 | Grube et al. |
| 2003/0110297 A1 | 6/2003 | Tabatabai et al. |
| 2003/0117445 A1 | 6/2003 | Hendricks et al. |
| 2003/0154492 A1 | 8/2003 | Falvo et al. |
| 2003/0179315 A1 * | 9/2003 | Collins et al. ............ 348/441 |
| 2003/0187916 A1 | 10/2003 | Dettinger et al. |
| 2003/0191816 A1 | 10/2003 | Landress et al. |
| 2003/0212999 A1 | 11/2003 | Cai |
| 2003/0226151 A1 | 12/2003 | Hamada et al. |
| 2003/0233561 A1 | 12/2003 | Ganesan et al. |
| 2004/0003405 A1 | 1/2004 | Boston et al. |
| 2004/0024809 A1 | 2/2004 | Edwards et al. |
| 2004/0025179 A1 * | 2/2004 | Russ et al. ................ 725/46 |
| 2004/0028049 A1 * | 2/2004 | Wan ........................ 370/394 |
| 2004/0031049 A1 | 2/2004 | Suzuki et al. |
| 2004/0039916 A1 | 2/2004 | Aldis et al. |
| 2004/0040039 A1 * | 2/2004 | Bernier ...................... 725/46 |
| 2004/0043763 A1 | 3/2004 | Minear et al. |
| 2004/0048503 A1 | 3/2004 | Mills et al. |
| 2004/0083492 A1 | 4/2004 | Goode et al. |
| 2004/0117822 A1 | 6/2004 | Karaoguz et al. |
| 2004/0117857 A1 | 6/2004 | Bisdikian et al. |
| 2004/0153547 A1 | 8/2004 | Trossen |
| 2004/0177383 A1 | 9/2004 | Martinolich et al. |
| 2004/0193545 A1 | 9/2004 | Shlasky |
| 2004/0216158 A1 | 10/2004 | Blas |
| 2004/0226048 A1 | 11/2004 | Alpert et al. |
| 2004/0236854 A1 | 11/2004 | Roy et al. |
| 2004/0261114 A1 | 12/2004 | Addington et al. |
| 2004/0268420 A1 | 12/2004 | Addington et al. |
| 2005/0010653 A1 | 1/2005 | McCanne |
| 2005/0015765 A1 | 1/2005 | Covell et al. |
| 2005/0015803 A1 * | 1/2005 | Macrae et al. ............ 725/41 |
| 2005/0078677 A1 | 4/2005 | Benting et al. |
| 2005/0085183 A1 | 4/2005 | Lee |
| 2005/0090235 A1 | 4/2005 | Vermola et al. |
| 2005/0108770 A1 | 5/2005 | Karaoguz et al. |
| 2005/0120369 A1 | 6/2005 | Matz |
| 2005/0132207 A1 | 6/2005 | Mourad |
| 2005/0154679 A1 | 7/2005 | Bielak |
| 2005/0182852 A1 | 8/2005 | Tinsley et al. |
| 2005/0188403 A1 | 8/2005 | Kotzin |
| 2005/0244148 A1 * | 11/2005 | Tsumagari et al. ............ 386/125 |
| 2005/0264704 A1 | 12/2005 | Leinonen |
| 2005/0276246 A1 | 12/2005 | Walker et al. |
| 2006/0031882 A1 | 2/2006 | Swix et al. |
| 2006/0059045 A1 | 3/2006 | Babbar et al. |
| 2006/0095410 A1 | 5/2006 | Ostrover et al. |
| 2006/0107282 A1 | 5/2006 | De Heer |
| 2006/0112182 A1 | 5/2006 | Chen et al. |
| 2006/0136905 A1 * | 6/2006 | Thissen et al. ................ 717/174 |
| 2006/0200745 A1 | 9/2006 | Furmanski et al. |
| 2006/0205395 A1 | 9/2006 | Barone et al. |
| 2006/0218590 A1 | 9/2006 | White |
| 2006/0277576 A1 | 12/2006 | Acharya et al. |
| 2007/0055629 A1 | 3/2007 | Walker et al. |
| 2007/0061860 A1 | 3/2007 | Walker et al. |
| 2007/0067597 A1 | 3/2007 | Chen et al. |
| 2007/0073834 A1 | 3/2007 | Charlebois et al. |
| 2007/0074240 A1 | 3/2007 | Addington et al. |
| 2007/0078944 A1 | 4/2007 | Charlebois et al. |
| 2007/0106522 A1 | 5/2007 | Collins |
| 2007/0115929 A1 | 5/2007 | Collins et al. |
| 2007/0117536 A1 | 5/2007 | Walker et al. |
| 2008/0194196 A1 | 8/2008 | Angelhag et al. |
| 2008/0263599 A1 * | 10/2008 | Knudson et al. ............ 725/50 |
| 2009/0125952 A1 | 5/2009 | Chen et al. |
| 2009/0150922 A1 * | 6/2009 | Russ et al. ................ 725/30 |
| 2010/0154000 A1 * | 6/2010 | Macrae et al. ............ 725/41 |

FOREIGN PATENT DOCUMENTS

| | | |
|---|---|---|
| CN | 1301454 A | 6/2001 |
| CN | 1303568 A | 7/2001 |
| CN | 1310549 A | 8/2001 |
| CN | 1568603 | 1/2005 |
| EP | 0749221 | 12/1996 |
| EP | 0609936 B1 | 1/1999 |
| EP | 1089560 | 4/2001 |
| EP | 0820193 | 4/2002 |
| EP | 1193976 | 4/2002 |
| JP | 1994291780 | 10/1994 |
| JP | 8506938 | 7/1996 |
| JP | 08506941 | 7/1996 |
| JP | 08506942 | 7/1996 |
| JP | 8275077 A | 10/1996 |
| JP | 10276380 A | 10/1998 |
| JP | 11155138 | 6/1999 |
| JP | 1999175426 | 7/1999 |
| JP | 2000349725 A | 12/2000 |
| JP | 2001054089 A | 2/2001 |
| JP | 2001092880 A | 4/2001 |
| JP | 2001217860 A | 8/2001 |
| JP | 2001230996 A | 8/2001 |
| JP | 2001519626 A | 10/2001 |
| JP | 2002508637 T | 3/2002 |
| JP | 2002125161 A | 4/2002 |
| JP | 2002171228 A | 6/2002 |
| JP | 2002176589 A | 6/2002 |
| JP | 2003101812 A | 4/2003 |
| JP | 2003134490 A | 5/2003 |
| JP | 2003203035 A | 7/2003 |
| JP | 2003289520 A | 10/2003 |
| JP | 2004007063 A | 1/2004 |
| JP | 2004046833 | 2/2004 |
| JP | 2004056178 A | 2/2004 |
| JP | 2004287978 A | 10/2004 |
| JP | 2005039853 | 2/2005 |
| JP | 2005079989 A | 3/2005 |
| JP | 2005149129 A | 6/2005 |
| JP | 2006135388 | 5/2006 |
| KR | 19990021860 | 3/1999 |

| | | |
|---|---|---|
| KR | 1020000059098 | 10/2000 |
| KR | 20010034740 | 4/2001 |
| KR | 20030001368 | 1/2003 |
| RU | 2073913 C1 | 2/1997 |
| RU | 2220513 | 12/2003 |
| RU | 2239293 | 10/2004 |
| RU | 2254611 | 6/2005 |
| RU | 2321965 | 4/2008 |
| TW | I226797 | 1/2005 |
| TW | I233560 | 6/2005 |
| TW | 200523781 | 7/2005 |
| TW | I242190 | 10/2005 |
| WO | 9414282 | 6/1994 |
| WO | WO9414279 | 6/1994 |
| WO | WO9843427 | 1/1998 |
| WO | 9843426 | 10/1998 |
| WO | 9918721 | 4/1999 |
| WO | WO9949663 A1 | 9/1999 |
| WO | WO9952285 A1 | 10/1999 |
| WO | 0021006 | 4/2000 |
| WO | 0028742 | 5/2000 |
| WO | 0033197 | 6/2000 |
| WO | 0163900 | 8/2001 |
| WO | WO0217567 | 2/2002 |
| WO | 0239741 | 5/2002 |
| WO | 02065803 | 8/2002 |
| WO | 02084524 | 10/2002 |
| WO | 02087273 | 10/2002 |
| WO | 02099673 | 12/2002 |
| WO | WO03003704 A2 | 1/2003 |
| WO | WO2004002187 | 12/2003 |
| WO | 2004021671 | 3/2004 |
| WO | W02004079589 A | 9/2004 |
| WO | 2005022791 | 3/2005 |
| WO | 2005045603 | 5/2005 |
| WO | WO2005060257 A1 | 6/2005 |
| WO | 2005069624 | 7/2005 |
| WO | 2006015226 | 2/2006 |
| WO | 2006099239 | 9/2006 |
| WO | WO2007033143 | 3/2007 |

OTHER PUBLICATIONS

Wong, et al, "Efficient Management of XML Contents over Wireless Environment by Xstream", 2004 ACM Symposium on Applied Computing, pp. 1122-1127.*

Earnshaw, et al., "The TV-Anytime Content Reference Identifier," Network Working Group, RFC 4078, May 2005.

Peyret, et al., "Smart Cards Provide Very High Security and Flexibility in Subscribers Management," Aug. 1990, IEE Transactions and Consumer Electronics, vol. 36, No. 3, pp. 744-752.

ISO-IEC 15706, Information and documentation—International standard Audiovisual Number (ISAN), 2002.

IPDC in DVB-H: Technical Requirements CBMS1026 v1.0.0 Rev. 1/TM 3095 Rev.2, 2004.

OMA: "Mobile Broadcast Services Requirements" Candidate Version 1.0, Feb. 3, 2005, pp. 1-69, pp. 14-21.

International Search Report—PCT/US06/060684, International Search Authority—European Patent Office, Mar. 23, 2007.

Written Opinion—PCT/US06/060684, International Search Authority—European Patent Office, Mar. 23, 2007.

International Preliminary Report on Patentability—PCT/US06/060684, The International Bureau of WIPO—Geneva, Switzerland, May 22, 2008.

Das, S., "STAR News Goes Pay, to Attract Flat Rate of Rs 2," Financial Express, Aug. 4, 1999.

ESG Datamodel Comparison between OMA BCAST and DVB CBMS, Aug. 22, 2005, Open Mobile Alliance LTD.

Landler, M. "The Dishes Are Coming: Satellites Go Suburban," New York Times, Late Edition—Final Ed., col. 5, p. 37, May 29, 1995.

Miller, A.L., "Cable Company Changes Channels Prestige Offers Cheaper Service," Baltimore Morning Sun, CAR edition, p. 8B, Oct. 21, 1992.

Steinberg, D., "Comcast to Roll out New Sports Package for Digital Cable," Philadelphia Inquirer, City edition, p. D02, Aug. 1, 2004.

Taiwanese Search report—095133703—TIPO—Apr. 8, 2010.

Taiwanese Search report—095133272—TIPO—Oct. 7, 2010.

Tomoko Itao, Introduction of Dynamically Adaptive Networking Service Environment: DANSE, Multimedia, Distributed, Cooperative and Mobile (DICOMO), Symposium Collected Papers, 1997-2000, Ver. 1.1 [DVD-ROM], Japan, Aggregate Corporation Information Processing Society, Jul. 2, 1997, pp. 125-130.

Masuda Kazuo, "Visual Explorer of Kazuo Masuda", PC User, Softbank Publishing Corp., Mar. 2005, vol. 12, No. 3, pp. 78-81.

Supplementary European Search Report—EP06803088—Search Authority—The Hague—Feb. 10, 2011.

Translation of Office Action in Canadian application 2621676 corresponding to U.S. Appl. No. 12/353,869.

Translation of Office Action in Chinese application 200680041815.8 corresponding to U.S. Appl. No. 11/270,372.

Translation of Office Action in Japan application 2008-540332 corresponding to U.S. Appl. No. 11/270,165.

Translation of Office Action in Japan application 2008-540334 corresponding to U.S. Appl. No. 11/270,167.

Xstream: A Middleware for Streaming XML Contents over Wireless Environments, Wugene Y.C.Wong, etc., Software Engineering, IEEE Transactions on, Jan. 10, 2005.

* cited by examiner

METHODS AND APPARATUS FOR FRAGMENTING SYSTEM INFORMATION MESSAGES IN WIRELESS NETWORKS

CROSS-REFERENCE TO RELATED APPLICATIONS

The present Application for Patent is related to the following co-pending U.S. Patent Applications:

U.S. patent application Ser. No. 11/270,199 entitled "METHODS AND APPARATUS FOR DISTRIBUTING CONTENT TO SUPPORT MULTIPLE CUSTOMER SERVICE ENTITIES AND CONTENT PACKAGERS", filed Nov. 8, 2005, assigned to the assignee hereof, and expressly incorporated by reference herein, U.S. patent application Ser. No. 11/270,372 entitled "APPARATUS AND METHODS OF OPEN AND CLOSED PACKAGE SUBSCRIPTION", filed Nov. 8, 2005, assigned to the assignee hereof, and expressly incorporated by reference herein, U.S. patent application Ser. No. 11/270,413, now U.S. Pat. No. 7,565,506, entitled "METHOD AND APPARATUS FOR DELIVERING CONTENT BASED ON RECEIVERS CHARACTERISTICS", filed Nov. 8, 2005, assigned to the assignee hereof, and expressly incorporated by reference herein, U.S. patent application Ser. No. 11/270,166 entitled "APPARATUS AND METHODS FOR PROVIDING AND PRESENTING CUSTOMIZED CHANNEL INFORMATION", filed Nov. 8, 2005, assigned to the assignee hereof, and expressly incorporated by reference herein, U.S. patent application Ser. No. 11/270,370 entitled "APPARATUS AND METHODS FOR DELIVERING AND PRESENTING AUXILIARY SERVICES FOR CUSTOMIZING A CHANNEL", filed Nov. 8, 2005, assigned to the assignee hereof, and expressly incorporated by reference herein, U.S. patent application Ser. No. 11/270,210 entitled "METHODS AND APPARATUS FOR DELIVERING REGIONAL PARAMETERS", filed Nov. 8, 2005, assigned to the assignee hereof, and expressly incorporated by reference herein, U.S. patent application Ser. No. 11/270,165 entitled "FLEXIBLE SYSTEM FOR DISTRIBUTING CONTENT TO A DEVICE", filed Nov. 8, 2005, assigned to the assignee hereof, and expressly incorporated by reference herein, U.S. patent application Ser. No. 11/270,167 entitled "SYSTEM FOR DISTRIBUTING PACKAGES AND CHANNELS TO A DEVICE" filed Nov. 8, 2005, assigned to the assignee hereof, and expressly incorporated by reference herein.

BACKGROUND

1. Field

The present application relates generally to media delivery in a data network, and to methods and apparatus for fragmenting system information messages for delivery over a wireless network.

2. Background

In a content delivery/media distribution system, programming information that describes content and delivery schedule of available content and/or services may be provided to devices in a distribution network. For example, a content distribution network that operates on the media distribution network may provide the programming and/or system information messages to devices in communication with the network. Devices receiving the information operate to display the information to device users who may then subscribe and/or select content and/or services to be received. For example, a device user views the programming guide and/or system information, and may then select and subscribe to receive content and/or services that include multimedia content, clips, programs, scripts, data, customer services, or any other type of content or service.

Therefore, what is needed is a system that operates to allow large system information messages to be efficiently delivered to devices that may have memory limitation or delivery quality requirements.

SUMMARY

Methods and apparatus for sending system information (SI) associated with media directed to a device are disclosed. In one aspect, the method includes the steps of fragmenting system information into a plurality of fragments, and transporting the fragments to a device. In another aspect, a method for receiving system information associated with media directed to a device includes receiving system information fragments, and reassembling the fragments to recover the system information.

DETAILED DESCRIPTION

System information (SI) Distribution Protocols

Figure 1:
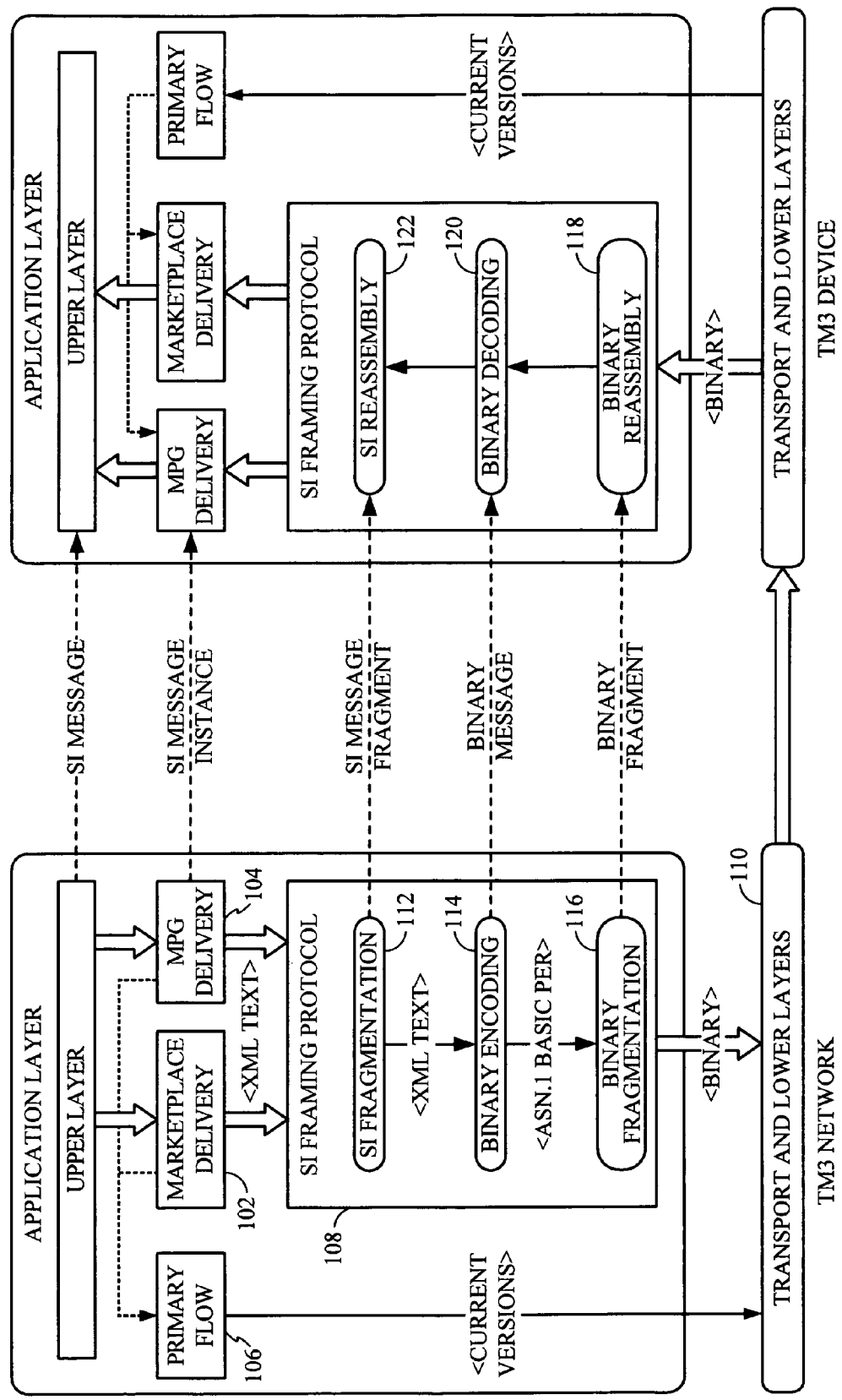
FIG. 1 shows one embodiment of a system for delivering system information (SI) messages.

In one embodiment, one or more protocols (e.g., application layer protocol entities) may be used for the delivery and update of the System Information (SI) on a device. FIG. 1 shows one embodiment for the SI delivery protocols. In one embodiment, there may be two SI delivery protocols:

The "Marketplace Delivery Protocol" 102, which may be used to deliver Marketplace and System information (MSI); and The "MPG Delivery Protocol" 104, which may be used to deliver MPG blocks.

The above protocols may utilize the services of a shared "SI Framing Protocol" 108.

The signaling related to a current version of SI messages may be delivered in a "Primary Flow" 106. The SI framing protocol 108 may utilize the services provided by "Transport Layer protocols" 110.

In one embodiment, the upper layer 124 in the network generates, maintains, and updates system information. New or modified SI elements or attributes may be made available to the marketplace and MPG delivery protocol entities for incorporation in SI messages. An SI message is created, or a new or modified element is incorporated in an existing SI message, and the SI version number is updated.

The marketplace and MPG delivery protocol entities in the network may communicate the latest SI versioning information to the primary flow protocol, and may schedule the delivery of copies of the SI message over the appropriate multicast or unicast channels, e.g., SI flows.

The SI framing protocol entity 108 in the network receives SI messages from the marketplace and/or MPG delivery protocol entities. The SI messages may be encoded in XML, SGML, or any other structural markup language text formats.

In one embodiment, the SI framing protocol entity 108 fragments an SI message into SI message fragments, 112, if the size of the SI message exceeds a configurable maximum size. The SI message instances or SI message fragments may then be encoded, e.g., to a binary format, 114, as binary SI messages. The binary SI messages may be subject to additional fragmentation into smaller binary fragments, 116, for transport. The SI message fragments, the SI messages, the binary fragments, or any combination thereof, are then passed to the transport layer protocol entity 110, for delivery over a multicast interface, for example.

The MPG and marketplace delivery protocol entities at the device may receive SI versioning information from the primary flow protocol entity upon activation, and optionally periodically thereafter. When a change to the current version of an SI message is detected, the device may select the corresponding SI flow to acquire the latest information.

In one embodiment, the SI message fragments, the binary-encoded SI message fragments, the binary fragments, or any combination thereof are received at the device. The received fragments may be binary reassembled 118, binary decoded 120, and XML reassembled, 122. If an SI message instance is received in fragments, the SI framing protocol at the device passes the entire information from the SI message to the marketplace or MPG delivery protocol entity after the constituent SI fragments are received, so that the original SI message may be reassembled.

SI Framing Protocol

In one embodiment, the SI framing protocol 108 provides four services:

Fragmentation and reassembly of SI messages, 112 and 122

Encoding and decoding of SI messages or fragments, 114 and 120

Fragmentation and reassembly of the encoded SI messages or fragments, 116 and 118; and Management of transmission and reception of the encoded SI messages or fragments by the transport layer, 110.

SI Message Fragmentation

SI message fragmentation refers to the fragmentation and reassembly of SI Messages. SI fragmentation may be performed to:

Mitigate the effect of packet loss, and/or

Accommodate physical, e.g., memory, limitations on the device by allowing the entire received SI message fragment to be loaded in the available memory on the device. In one embodiment, the SI message is made available to the upper layer 126 in the device only after all fragments are received.

In one embodiment, the network may fragment an SI Message into two or more SI message fragments, if the size of the SI message exceeds a predetermined "SI_Message_Max_Size" parameter. The SI_Message_Max_Size is a configurable network parameter whose value may depend on the transport reliability requirements and the physical, e.g., memory, display size, processor type, etc., limitations on the device. The SI_Message_Max_Size may depend on the transmission technology, i.e., it may be a uniform parameter that accommodates all the device limitations (e.g., memory size) in broadcast transmission, but may vary from device to device in unicast transmission. The maximum allowable loss probability for SI messages may limit the maximum size of SI messages and, therefore; the maximum size of the SI message payload prior to binary encoding. Further, the decoding process and the maximum size of the decoding buffer on the device may also impose a limit on the value of SI_Message_Max_Size.

SI Message Fragment Structure

In one embodiment, an SI message fragment includes the root attributes of the parent SI message, additional fragment attributes, and one or more atomic elements. An atomic element is an element or sub-element of the message fragment that may not be further fragmented. An SI message fragment may not exceed SI_Message_Max_Size. The number of fragments may not exceed "SI_Fragments_Max_Number," a configurable network parameter whose value depends on the transport reliability requirements and the memory limitations on the device. If it is not possible to fragment an SI message because of either or both of these restrictions, the network may abort the transmission of the SI message.

Figure 2:
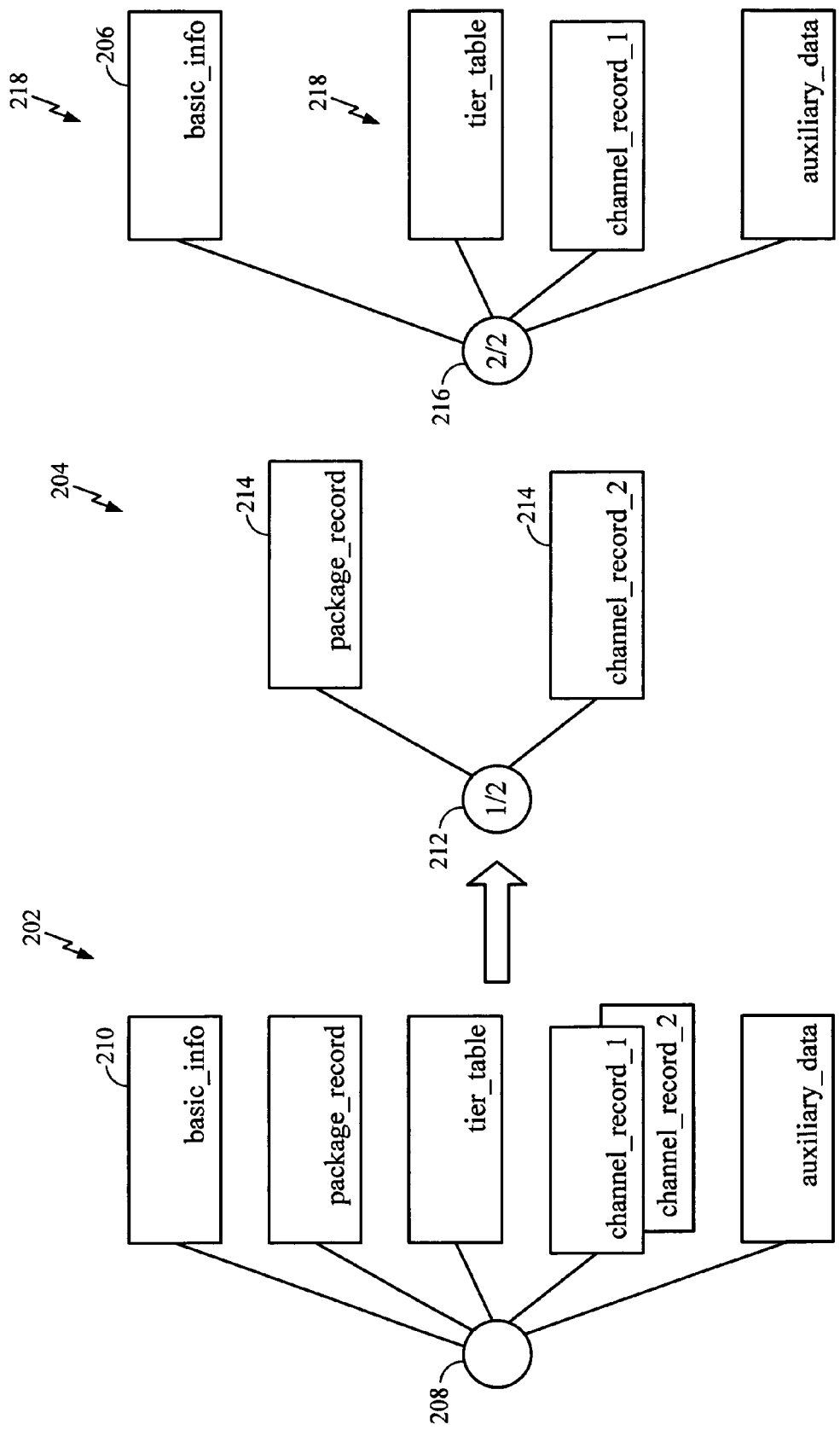
FIG. 2 shows one embodiment of an SI message fragmentation.

The SI message fragment attribute may include a fragment ID and/or the total number of fragments of the parent SI message. An example of the fragmentation of a "Marketplace Content Retailer" message instance being partitioned into two SI message fragments is depicted in FIG. 2. FIG. 2 shows a parent SI message 202, and two exemplary SI message fragments 204 and 206 of the parent SI message 202. The SI message 202 has message root attributes 208 and message atomic elements 210. The message root attributes 208 may include an SI message ID, an SI message version number, and/or one or more SI message specific fields or keys. The SI message fragment 204 has fragment root attributes 212, and fragment atomic elements 214. The fragment root attributes 212 includes its parent message root attributes 208, e.g., SI message ID, the message version number, and/or one or more message specific fields or keys, and the fragment attributes, e.g., fragment ID (e.g., 1) and the total number of fragments (e.g., 2) of the parent SI message. The SI message fragment 206 has fragment root attributes 216, and fragment atomic elements 218. The fragment root attributes 216 includes its parent message root attributes 208, e.g., SI message ID, the message version number, and/or one or more message specific fields or keys, and the fragment attributes, e.g., fragment ID (e.g., 2) and the total number of fragments (e.g., 2) of the parent SI message.

The atomic elements of an SI message instance depend on the type of SI message, among other possible parameters. Each direct sub-element of an SI message instance is an atomic element. Table 1 lists the atomic elements of the listed SI message types.

TABLE 1

Atomic Elements

| SI Message | Atomic Elements |
| --- | --- |
| Marketplace Common | Classification Scheme Table |
|  | BCS Record |
| Marketplace Content Retailer | Basic Info |
|  | EULA Table |
|  | Package Record |
|  | Tier Record |
|  | Channel Record |
|  | Auxiliary Data |
| Service Definition | Service Record |
|  | Auxiliary Service Record |
| MPG Block | MPG Title Record |
|  | Channel Customization Record |
|  | Contact Window |
|  | Blackout Record |

Fragment Attributes

In one embodiment, two root attributes are defined for an SI message Fragment:

Fragment ID

Number of fragments

These attributes may be present in the SI message fragments, but they are not present in un-fragmented SI messages.

The fragment ID attribute uniquely distinguishes the SI message fragment from all other SI message fragments of the same version of an SI message. The fragment ID attribute may be an 8-bit unsigned integer, for example. The value of the fragment ID attribute may be set to "1" for the first SI message fragment, and may be incremented, e.g., by 1, for each subsequent fragment of the same SI message instance. The value of the fragment ID may not exceed SI_Fragments_Max_Number.

The number-of-fragments attribute specifies the number of SI message fragments of an SI message instance. The number-of-fragments attribute may be an 8-bit unsigned integer, for example. The value of the number-of-fragments attribute may be equal to the maximum value of the fragment ID attribute used by the SI message fragments of the version of the SI message being fragmented. The minimum value of the number-of-fragments attribute is 2. The number-of-fragments attribute has the same value in all SI message fragments of the same version of the SI message.

Encoding of SI Message Fragments

Each SI message or SI message fragment may be encoded to a second language representation, e.g., binary, as shown in FIG. 1, 114. The binary encoding algorithm may include "ASN.1 Basic PER" algorithm, as specified in ISO/IEC 8825-2. Both aligned and unaligned options may be supported.

Fragmenting Encoded SI Message Fragments

The network may divide each encoded SI message into one or more (e.g., binary) fragments. The binary fragments except the last one may be of the same size. The size of a binary fragment may be specified by a system parameter Binary_SI_Message_Fragment_Size. For example, a binary SI message may be fragmented into 255 binary fragments. Each binary fragment may be prefaced by a header that allows the device to identify each fragment and reassemble the original binary SI message. The device reassembles, 118, each binary SI message before decoding it. One embodiment of the format of the binary fragment header is shown in Table 2.

TABLE 2

Binary SI Fragment Header Format

| Field Name | Field Type |
| --- | --- |
| MESSAGE_ID | UINT(n) |
| MESSAGE_SPECIFIC_FIELDS | VARIABLE |
| FRAGMENT_ID | UINT(n) |
| TOTAL_FRAGMENTS | UINT(n) |

Where, UINT stands for Unsigned Integer (n bits). The fields of the binary SI fragment header are defined in the following subsections.

Message_ID

This field identifies the type of SI message being fragmented. Some values for the MESSAGE_ID field are described in Table 3.

TABLE 3

Binary SI fragment MESSAGE_ID values

| SI Message Type | MESSAGE_ID Value |
| --- | --- |
| SERVICE_DEFINITION | 1 |
| MARKETPLACE_COMMON | 2 |
| CONTENT_RETAILER_MARKETPLACE | 3 |
| MPG_BLOCK | 4 |

For example, the MESSAGE_ID field is set to SERVICE_DEFINITION if the SI message being fragmented is a service definition SI message.

Message_Specific_Fields

The MESSAGE_SPECIFIC_FIELDS or keys convey the values of the SI message fields that distinguish different SI messages. The set of fields involved is specific to each type of SI message. Accordingly, the size of the MESSAGE_SPECIFIC_FIELDS varies from 2 bytes to 5 bytes according to the value of MESSAGE_ID. In one embodiment, a format of the MESSAGE_SPECIFIC_FIELDS when the MESSAGE_ID is set to MARKETPLACE_COMMON or SERVICE_DEFINITION is shown in Table 4.

TABLE 4

Binary SI fragment MESSAGE_SPECIFIC_FIELDS - MARKETPLACE_COMMON and SERVICE_DEFINITION messages

| Field Name | Field Type |
| --- | --- |
| VERSION | UINT(n) |

In one embodiment, a format of the MESSAGE_SPECIFIC_FIELDS when the MESSAGE_ID is set to CONTENT_RETAILER_MARKETPLACE is shown in Table 5.

TABLE 5

Binary SI fragment MESSAGE_SPECIFIC_FIELDS - CONTENT_RETAILER_MARKETPLACE messages

| Field Name | Field Type |
| --- | --- |
| CONTENT_RETAILER_ID | UINT(n) |
| VERSION | UINT(n) |

In one embodiment, a format of the MESSAGE_SPECIFIC_FIELDS when the MESSAGE_ID is set to MPG_BLOCK is shown in Table 6.

TABLE 6

Binary SI fragment MESSAGE_SPECIFIC_FIELDS - MPG_BLOCK messages

| Field Name | Field Type |
| --- | --- |
| MPG_BLOCK_START_TIME | UINT(n) |
| MPG_BLOCK_VERSION | UINT(n) |

Fragment_ID

Each fragment of a message is identified by the FRAGMENT_ID. This field may be used by the device to locate the position of the fragment in the binary SI message and to determine when it has received all the required fragments of the message.

Fragments may be numbered sequentially according to their position in the binary SI message, e, g., starting with 0. The value of the last fragment would be equal to TOTAL- _FRAGMENTS−1. For example, when a binary SI message is fragmented into 255 fragments, the value of FRAGMENT_ID may not exceed 254.

Total_Fragments

This field indicates the total number of fragments of an SI message. For example, the range of values for this field is 1 through 255.

Distribution Algorithm

The network may transmit the binary SI message fragments of a given version of an SI message at least once before starting transmission of the next SI message on the same SI flow. The maximum interval between consecutive message fragment transmissions may not exceed $T_{FRAGMENT\_ACQUISITION}$ (ms) parameter. $T_{FRAGMENT\_ACQUISITION}$ is a configurable system parameter.

Acquisition of SI Message Fragments

A device which acquires an SI message in which the fragment attributes are present determines that the SI message is an SI Message fragment. The device may acquire the SI message fragments of a version of an SI message before processing the entire SI message.

Marketplace Delivery Protocol

The marketplace delivery protocol may deliver and/or update messages, such as the following SI messages:

Marketplace Common Message
Marketplace Content Retailer Message (per Content Retailer)
Service Definition Message The above SI messages are collectively referred to as Marketplace & System information (MSI). The network may deliver MSI corresponding to the Wide-area Operations Infrastructure (WOI), and if available, to Local-area Operations Infrastructure (LOI) multiplexes. The MSI pertaining to a WOI or LOI multiplex may be delivered over the corresponding WOI or LOI marketplace definition SI flows. The network may signal, e.g., on the primary flow, presence of the MSI on the marketplace definition SI flows, and the current Version of the MSI on each marketplace definition SI flow. The MSI may be transmitted cyclically, in a predetermined order. The maximum interval between consecutive transmissions of MSI messages may not exceed $T_{MARKETPLACE\_ACQUISITION}$ (ms). The $T_{MARKETPLACE\_ACQUISITION}$ may be a configurable system parameter. A device may acquire the MSI delivered on the WOI marketplace definition flow or on the LOI marketplace definition flow, if any present. The device may determine the current version of the MSI from the primary flow, and may detect an update to any MSI message as a change of version for that message in the primary flow.

Media Presentation Guide Delivery Protocol

The Media Presentation Guide (MPG) may provide a user with a schedule of what will be available for viewing on each Service. If the MPG Information is tied to a given time period, the network continuously delivers and updates the device with the latest MPG. The network may deliver MPG blocks for MPG titles transmitted in the WOI and, if available, in the LOI multiplexes. The MPG titles transmitted in a WOI or LOI multiplex may be delivered over the corresponding WOI or LOI Near-term and/or Far-term MPG SI flows. MPG block messages on each MPG flow may be transmitted cyclically, e.g., in ascending order of the value of the "Start_Time" attribute of the MPG block. The MPG block message may specify the "MPG_Block_Start_Time," which is the earliest time covered by the MPG block. The MPG_Block_Start_Time of each MPG blocks corresponds to the end of the interval covered by the previous MPG lock.

The maximum interval between consecutive transmissions of MPG block messages may not exceed $T_{MPG\_ACQUISITION}$ (ms). The $T_{MPG\_ACQUISITION}$ may be a configurable system parameter. The network may stop transmission of an MPG block when the "System Time" exceeds the "Start_Time" of the MPG Block by more than "MPG_Block_Duration." The MPG title record may specify the MPG_Block_Duration. If the service is a real-time service or an IP-datacast service, the MPG_Block_Duration added to the MP_Block_Start_Time is the time at which display of the content may end. If the service is a non-real-time service, the MPG_Block_Duration added to the MPG_Block_Start_Time is the latest time at which display of the content may commence, exclusive of any introductions associated with the MPG title. If the service is a "Per MPG Title" service, the significance of the MPG_Block_Start_Time is dependent on the nature of the content associated with the MPG title, as defined in the preceding two paragraphs.

The near-term MPG SI flow may be used to transmit the nearest MPG blocks applicable to a multiplex. The number of MPG blocks in the near-term MPG SI flow may not be less than MPG_Min_Num_Multicast_Blocks, where MPG_Min_Num_Multicast_Blocks is a configurable network parameter. The far-term MPG SI flow is used to transmit MPG blocks applicable to the multiplexes that are not transmitted in the near term MPG SI flow. The total number of MPG blocks in the near and far-term MPG SI flows combined may not exceed MPG_Max_Num_Multicast_Blocks, where MPG_Max_Num_Multicast_Blocks is a configurable network parameter.

MPG Block Version Management

The network may maintain a MPG_Version parameter, which may be incremented whenever:

An MPG block is added to the near-term or far-term MPG SI flow,
An MPG block is removed from the near-term or far-term MPG SI flow, and/or
The version of any MPG block is changed, The network may signal the current value of the MPG_Version to the device through the primary flow, to signal a change to at least one MPG block, the addition or deletion of an MPG block, or the transfer of an MPG block from a far-erm MPG SI flow to a near-term MPG SI flow.

MPG Distribution in Primary Flow

The network may signal the current values of the following parameters through the primary flow:

The presence or absence of an MPG SI flow,
MPG_Block_Duration,
The Start_Time of the earliest MPG block message currently being transmitted,
The number of MPG blocks currently being transmitted in the near-term flow,
The total number of MPG blocks currently being transmitted in the near-term and far-term flows,
The MPG_Version, and
The versions of each MPG block currently being transmitted.

The device may use these parameters to control initial acquisition of the MPG blocks, to detect the expiration, addition, deletion or change of MPG blocks, and to acquire updated versions of MPG blocks. The device may acquire and store at least the nearest MPG_Min_Num_Stored_Blocks MPG Blocks. The device may determine the current version of the MPG blocks and the availability of new MPG blocks from the primary flow.

Figure 3:
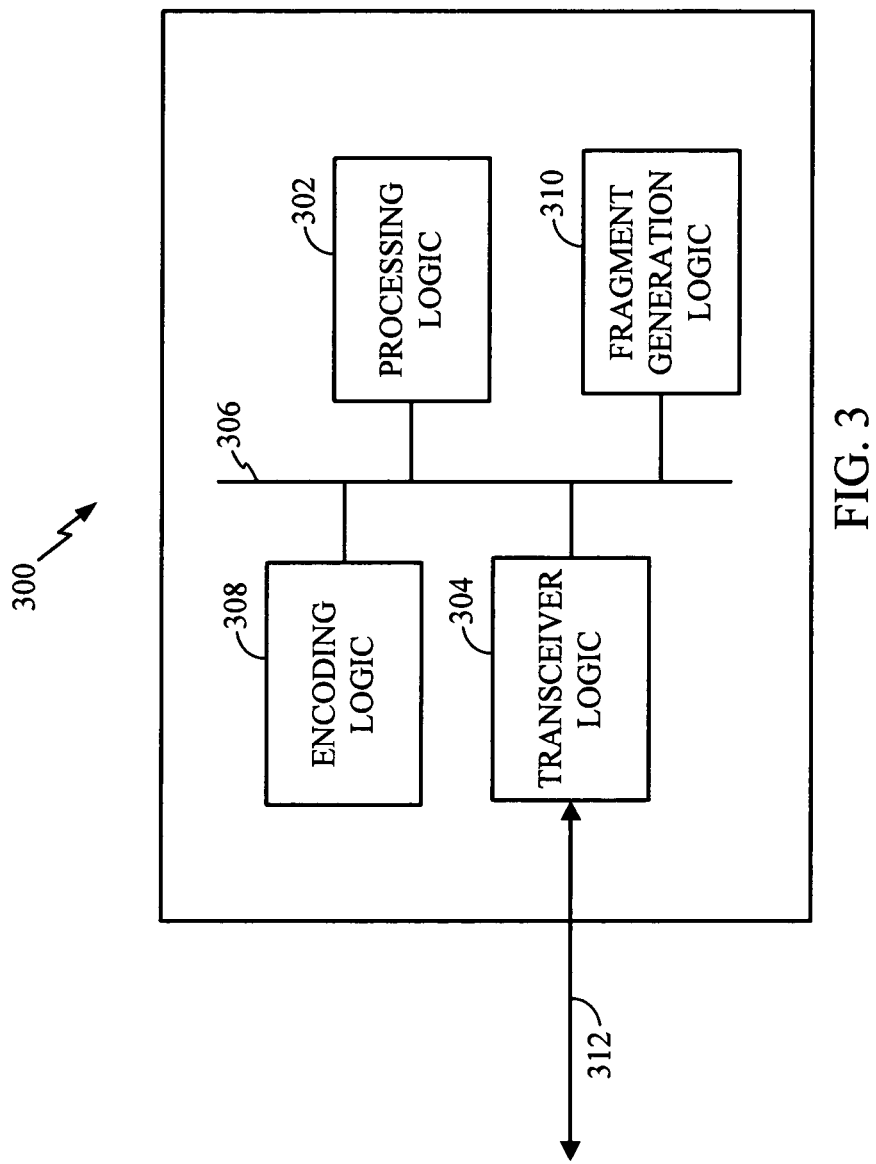
FIG. 3 shows one embodiment of a network server for delivering SI messages.

FIG. 3 shows one embodiment of a network server 300 for use in one embodiment of a delivery system for delivering SI messages. The server 300 comprises processing logic 302 and transceiver logic 304, which are coupled to an internal data bus 306. The server 300 also comprises encoder logic 308 and fragments generation logic 310.

In one or more embodiments, the processing logic 302 comprises a CPU, processor, gate array, hardware logic, memory elements, virtual machine, software, and/or any combination of hardware and software. Thus, the processing logic 302 generally comprises logic to execute machine-readable instructions and to control one or more other functional elements of the server 300 via the internal data bus 306.

The transceiver logic 304 comprises hardware logic and/or software that operate to allow the server 300 to transmit and receive data and/or other information with remote devices or systems using communication channel 312. For example, in one embodiment, the communication channel 312 comprises any suitable type of communication link to allow the server 300 to communicate with one or more data networks. For example, in one embodiment, the transceiver logic 304 operates to receive SI messages from one or more remote content servers or protocols. The server 300 then operates to fragment and or encode the SI messages that are transmitted to devices operating on one or more wide area networks.

Therefore, the server 300 operates in one or more embodiments of a delivery system to deliver SI messages to devices operating on one or more wide area networks. It should be noted that the server 300 illustrates just one implementation and that other implementations are possible within the scope of the embodiments.

Figure 4:
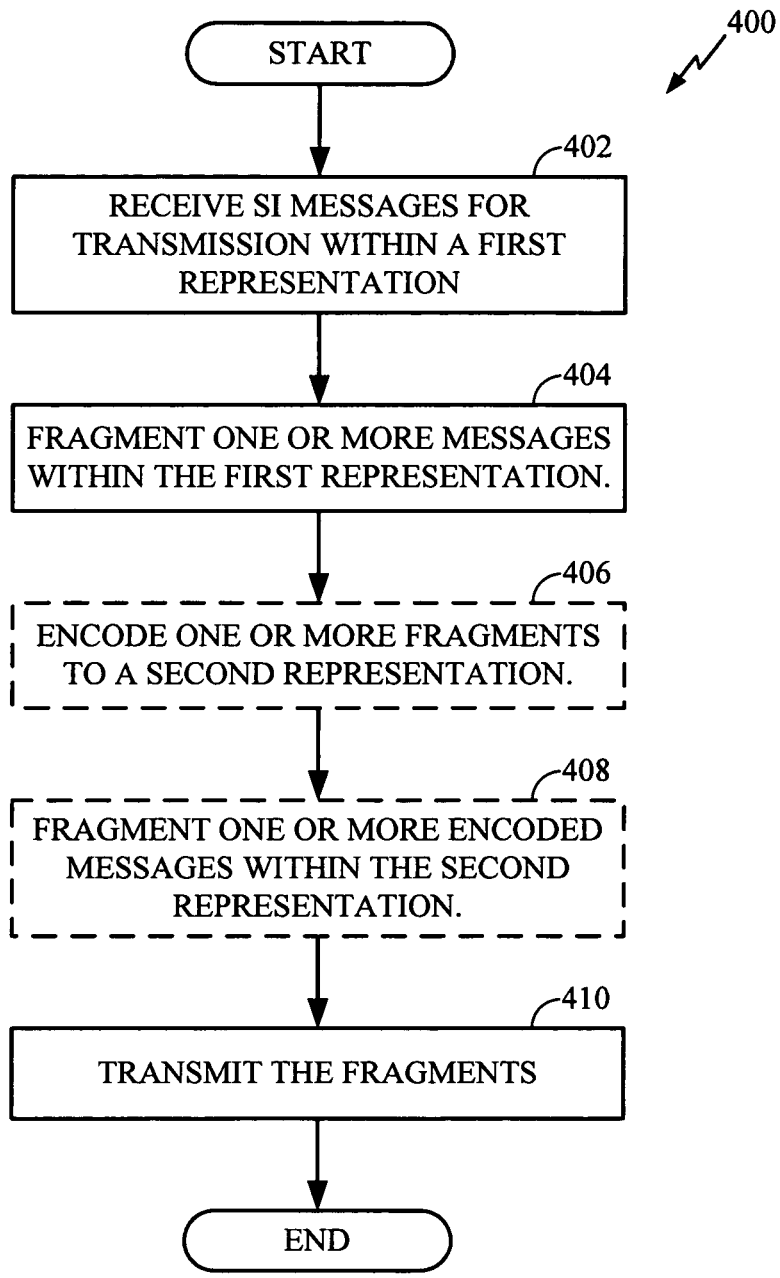
FIG. 4 shows one embodiment of a method for delivering SI messages.

FIG. 4 shows one embodiment of a method 400 for operating a network server in one embodiment of a SI-message delivery system. For clarity, the method 400 will be described with reference to the network server 300 shown in FIG. 3 and FIG. 1. In one embodiment, at least one processor, such as the processing logic 302, executes machine-readable instructions to control the server 300 to perform the functions described below. At block 402, one or more SI messages are received for transmission to one or more devices. The SI messages may be expressed in a first language representation, e.g., XML. For example, one or more content providers provide one or more SI messages for distribution to one or more devices. In one embodiment, the SI messages are received from the marketplace delivery protocol 102 and/or from MPG delivery protocol 104. At block 404, one or more SI messages are fragmented within the first representation. At block 406, one or more SI fragments may be encoded from the first representation to a second representation, e.g., binary. At block 408, one or more of the encoded fragments may be further fragmented within the second representation. At block 410, the fragments are transmitted to one or more devices. Thus, the method 400 operates to deliver SI messages to one or more devices with memory-size limitations. It should be noted that the method 400 represents just one implementation and that other implementations are possible within the scope of the embodiments.

Figure 5:
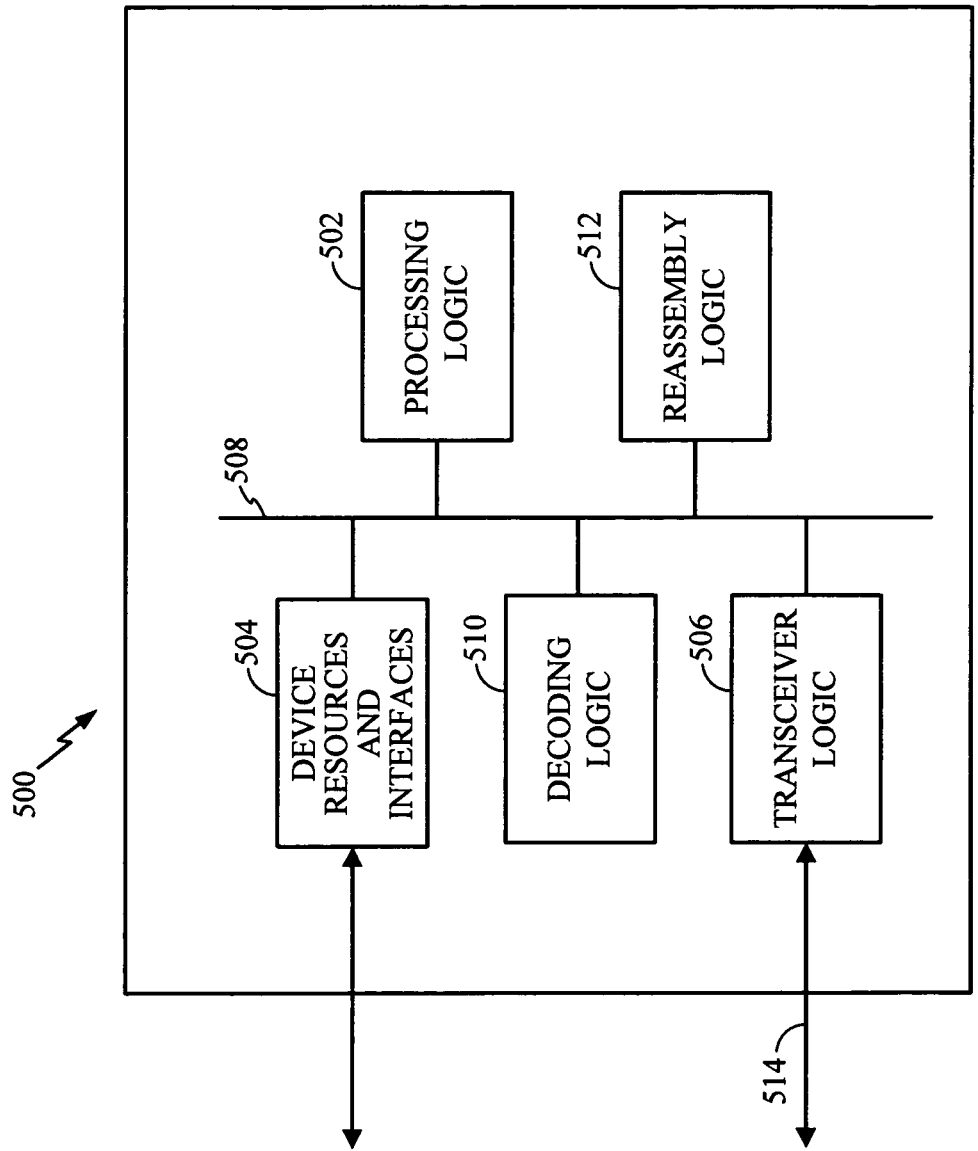
FIG. 5 shows one embodiment of a device for receiving SI messages.

FIG. 5 shows one embodiment of a device 500 for use in one embodiment of a system for delivering SI messages. The device 500 comprises processing logic 502, device resources and interface logic 504, and transceiver logic 506, which are coupled to an internal data bus 508. The device 500 also comprises decoding logic 510 and reassembly logic 512, which are also coupled to the data bus 508. In one or more embodiments, the processing logic 502 comprises a CPU, processor, gate array, hardware logic, memory elements, virtual machine, software, and/or any combination of hardware and software. Thus, the processing logic 502 generally comprises logic to execute machine-readable instructions and to control one or more other functional elements of the device 500 via the internal data bus 508.

The device resources and interfaces logic 504 comprise hardware and/or software that allow the device 500 to communicate with internal and external systems. For example, the internal systems may include mass storage systems, memory, display driver, modem, or other internal device resources. The external systems may include user interface devices, displays, printers, disk drives, keyboard, keypad, cursor keys, pointing device, or any other local devices or systems. For example, the device interface logic 504 operates to receive user inputs from a keypad, and output information to be displayed on a device display.

The transceiver logic 506 comprises hardware logic and/or software that operate to allow the device 500 to transmit and receive data and/or other information with remote devices or systems using communication channel 514. For example, in one embodiment, the communication channel 514 comprises any suitable type of communication link to allow the device 500 to communicate with one or more data networks. For example, in one embodiment, the transceiver logic 506 operates to receive SI messages and/or fragments from one or more remote servers. The SI messages and/or fragments received may then be processed by decoding logic 510 and/or reassembly logic 512.

In one embodiment, the delivery system comprises program instructions stored on a computer-readable medium, which when executed by at least one processor, for instance, the processing logic 502, provides the functions described herein. For example, the program instructions may be loaded into the device 500 from a computer-readable media, such as a floppy disk, CDROM, memory card, FLASH memory device, RAM, ROM, or any other type of memory device or computer-readable medium that interfaces to the device 500. In another embodiment, the instructions may be downloaded into the device 500 from an external device or network resource that interfaces to the device 500 through the transceiver logic 506. The program instructions, when executed by the processing logic 502, provide one or more embodiments of a delivery system.

Therefore, the device 500 operates in one or more embodiments of a delivery system to receive SI messages and/or fragments from a network server. It should be noted that the device 500 illustrates just one implementation and that other implementations are possible within the scope of the embodiments.

Figure 6:
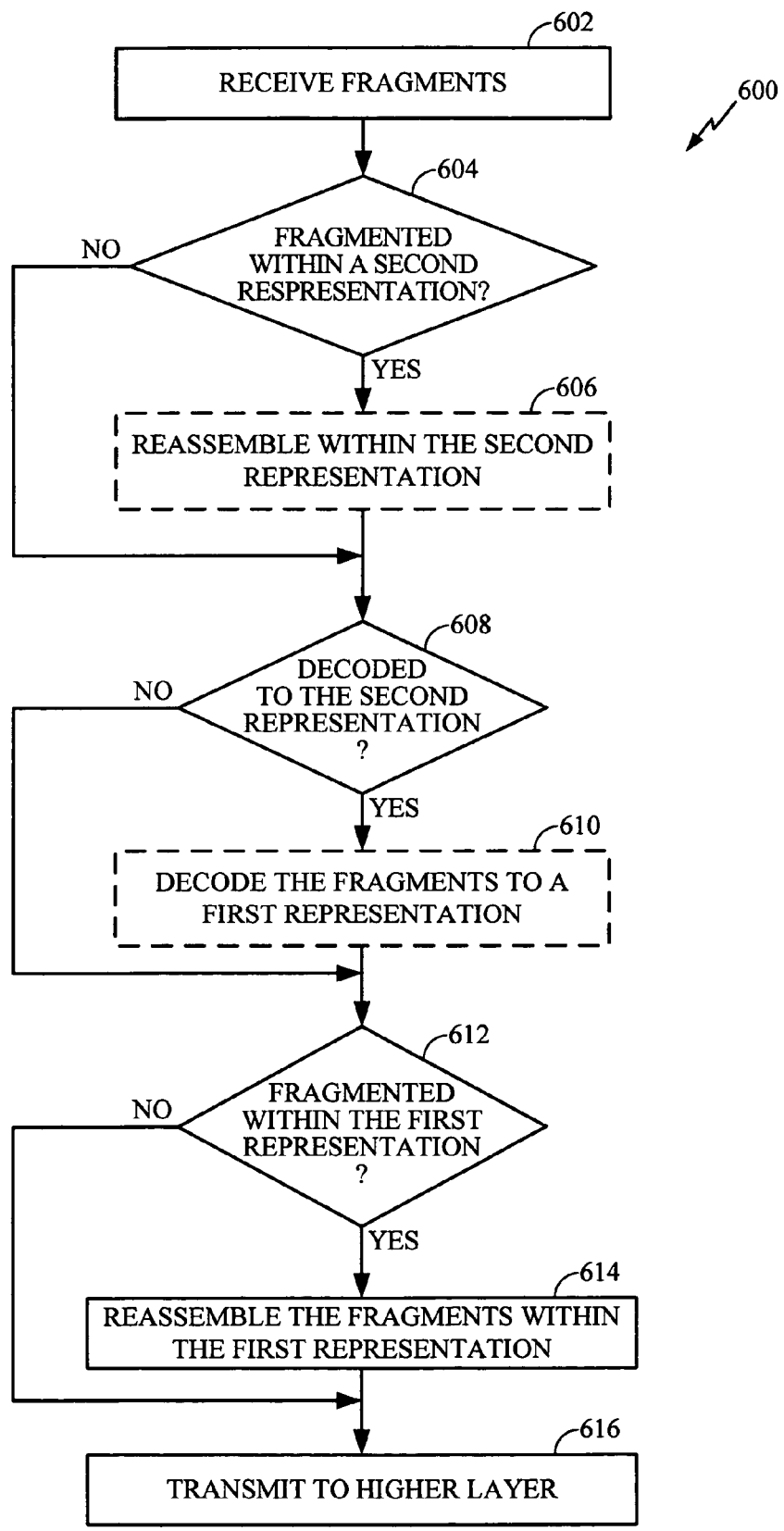
FIG. 6 shows one embodiment of a method for operating a device for receiving SI messages.

FIG. 6 shows one embodiment of a method 600 for operating a device in one embodiment. For clarity, the method 600 will be described with reference to the device 500 shown in FIG. 5, and FIG. 1. In one embodiment, at least one processor, such as the processing logic 502, executes machine readable instructions to control the device 500 to perform the functions described below.

At block 602, message fragments are received, which may have been through fragmentation in a first (e.g., XML) and/or a second (binary) language representation, at the network, 116. At block 604, it is determined whether the received fragments had been fragmented within a second representation. If yes, the received fragments are reassembled within the second representation, in step 606. At block 608, it is determined whether the fragments had been encoded from a first representation to the second representation. If yes, the fragments are decoded from the second representation to the first representation, in step 610. At block 612, it is determined whether the SI message had been fragmented within the first representation, e.g., XML. If yes, the fragments are reassembled within the first representation, in step 614. At block 616, the recovered SI messages are delivered to upper layer, e.g., marketplace delivery protocol and/or MPG delivery protocol.

Thus, the method 600 operates to allow a device to receive a SI messages in one embodiment of a delivery system. It should be noted that the method 600 represents just one implementation and that other implementations are possible within the scope of the embodiments.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

What is claimed is:

1. A method for sending system information messages expressed in a first language representation, associated with media directed to a device, the method comprising:
   fragmenting at least one system information message into a plurality of fragments within the first language representation, wherein each fragment carries at least one root attribute of the system information message;
   cyclically transporting the fragments in an ascending order to a device in one of a plurality of flows selected based on a content of the system information message;
   delivering, in a primary flow, signaling related to a current version and presence or absence of the at least one system information message by a plurality of application layer protocol entities; and
   delivering, by the plurality of application layer protocol entities, system information messages to a device that is configured to receive system information messages by a shared application layer framing protocol from at least one of the plurality of application layer protocol entities.

2. The method of claim 1, further comprising encoding at least one fragment into a second language representation.

3. The method of claim 2, wherein the framing protocol is performing at least one of:
   fragmentation and reassembly of the system information messages;
   encoding and decoding of the system information messages;
   fragmentation and reassembly of encoded system information messages;
   fragmentation and reassembly of encoded system information fragments; and
   management of a transmitting and receiving of system information fragments.

4. The method of claim 2, further comprising fragmenting at least one of the fragments within the second language representation.

5. The method of claim 4, wherein said encoding comprises encoding the fragments from XML representation into binary representation.

6. The method of claim 1, wherein said fragmenting comprises fragmenting the system information messages if the system information messages have a larger size than a predetermined limit.

7. The method of claim 6, wherein the predetermined limit is determined based on at least one physical characteristic of the device.

8. The method of claim 7, wherein the physical characteristic comprises available memory on the device.

9. The method of claim 1, wherein the system information message is included in a media presentation guide flow that provides a schedule of media available for viewing.

10. The method of claim 9, wherein the media presentation guide flow comprises a near term flow and a long term flow.

11. The method of claim 1, wherein the system information message is included in a marketplace information flow that provides information for subscribing to packages of media.

12. A method for receiving system information messages associated with media directed to a device, the method comprising:
   monitoring a primary flow for a version number of at least one system information flow message;
   when the at least one version number changes, receiving system information fragments of the corresponding system information message, each fragment carrying at least one attribute of a parent system information message expressed in a first language representation;
   receiving, in the primary flow, signaling related to a current version and presence or absence of the at least one system information message by a plurality of application layer protocol entities;
   receiving, from the plurality of application layer protocol entities, system information messages at the device from a shared framing application layer protocol from at least one of the plurality of application layer protocol entities; and
   reassembling the fragments to recover the parent system information message.

13. The method of claim 12, wherein if the fragments comprise fragments expressed in a second language representation, said reassembling comprises reassembling the fragments within the second language representation.

14. The method of claim 13, wherein if the fragments comprise fragments encoded within the second language representation, further comprising decoding the fragments to the first language representation.

15. The method of claim 12, further comprising storing each fragment on the device, wherein a size of each fragment is selected based on a size of memory on the device.

16. An apparatus for sending system information messages expressed in a first language representation, associated with media directed to a device, comprising:
  means for fragmenting at least one system information message into a plurality of fragments within the first language representation, wherein each fragment carries at least one root attribute of the system information message;
  means for cyclically transporting the fragments in an ascending order to a device in one of a plurality of flows selected based on a content of the system information message;
  means for delivering, in a primary flow, signaling related to a current version and presence or absence of the at least one system information message by a plurality of application layer protocol entities; and
  means for delivering, by the plurality of application layer protocol entities, system information messages to a device that is configured to receive system information messages by a shared application layer framing protocol from at least one of the plurality of application layer protocol entities.

17. The apparatus of claim 16, further comprising means for encoding at least one of the fragments into a second language representation.

18. The apparatus of claim 17, wherein the framing protocol is performing at least one of:
  fragmentation and reassembly of the system information messages;
  encoding and decoding of the system information messages;
  fragmentation and reassembly of encoded system information messages;
  fragmentation and reassembly of encoded system information fragments; and
  management of a transmitting and receiving of system information fragments.

19. The apparatus of claim 17, further comprising means for fragmenting at least one of the fragments within the second language representation.

20. The apparatus of claim 19 wherein said means for encoding comprises means for encoding the fragments from XML representation into binary representation.

21. The apparatus of claim 16, wherein said means for fragmenting comprises means for fragmenting the system information message if the system information message has a larger size than a predetermined limit.

22. The apparatus of claim 21, wherein the predetermined limit is determined based on at least one physical characteristic of the device.

23. The apparatus of claim 22, wherein the physical characteristic comprises available memory on the device.

24. The apparatus of claim 16, wherein the system information message is included in a media presentation guide flow that provides a schedule of media available for viewing.

25. The apparatus of claim 24, wherein the media presentation guide flow comprises a near term flow and a long term flow.

26. The apparatus of claim 16, wherein the system information message is included in a marketplace information flow that provides information for subscribing to packages of media.

27. An apparatus for receiving system information associated with media directed to a device, comprising:
  means for monitoring a primary flow for a version number of at least one system information flow message;
  means for receiving fragments of a system information message when a version number of the system information message changes, each fragment carrying at least one attribute of the system information message expressed in a first language representation;
  means for receiving, in the primary flow, signaling related to a current version and presence or absence of the at least one system information message by a plurality of application layer protocol entities;
  means for receiving, from the plurality of application layer protocol entities, system information messages at the device from a shared framing application layer protocol from at least one of the plurality of application layer protocol entities; and
  means for reassembling the fragments to recover the system information message.

28. The apparatus of claim 27, wherein said means for reassembling comprises means for reassembling the fragments within a second language representation if the fragments comprise fragments expressed in the second language representation.

29. The apparatus of claim 28, further comprising means for decoding the fragments to the first language representation if the fragments comprise fragments encoded within the second language representation.

30. The apparatus of claim 27, further comprising means for storing each fragment on the device, wherein a size of each fragment is selected based on a size of memory on the device.

31. A processor configured to perform a method for sending system information messages expressed in a first language representation, associated with media directed to a device, the method comprising:
  fragmenting at least one system information message into a plurality of fragments within the first language representation, wherein each fragment carries at least one root attribute of the system information message;
  cyclically transporting the fragments in an ascending order to the device in one of a plurality of flows selected based on a content of the system information message;
  delivering, in a primary flow, signaling related to a current version and presence or absence of the at least one system information message by a plurality of application layer protocol entities; and
  delivering, by the plurality of application layer protocol entities, system information messages to the device that is configured to receive system information messages by a shared application layer framing protocol from at least one of the plurality of application layer protocol entities.

32. The processor of claim 31, wherein the method further comprises encoding at least one fragment into a second language representation.

33. The processor of claim 32, wherein the framing protocol is performing at least one of:
  fragmentation and reassembly of the system information messages;

encoding and decoding of the system information messages;

fragmentation and reassembly of encoded system information messages;

fragmentation and reassembly of encoded system information fragments; and management of a transmitting and receiving of system information fragments.

34. The processor of claim 32, wherein the method further comprises fragmenting at least one of the fragments within the second language representation.

35. The processor of claim 34, wherein said encoding comprises encoding the fragments from XML representation into binary representation.

36. The processor of claim 31, wherein said fragmenting comprises fragmenting the system information messages if the system information messages have a larger size than a predetermined limit.

37. The processor of claim 36, wherein the predetermined limit is determined based on at least one physical characteristic of the device.

38. The processor of claim 37, wherein the physical characteristic comprises available memory on the device.

39. The processor of claim 31, wherein the system information message is included in a media presentation guide flow that provides a schedule of media available for viewing.

40. The processor of claim 39, wherein the media presentation guide flow comprises a near term flow and a long term flow.

41. The processor of claim 31, wherein the system information message is included in a marketplace information flow that provides information for subscribing to packages of media.

42. A processor configured to perform a method for receiving system information associated with media directed to a device, the method comprising:

monitoring a primary flow for a version number of at least one system information message;

when the version number changes, receiving fragments corresponding to the system information message, each fragment carrying at least one attribute of a parent system information message expressed in a first language representation;

receiving, in the primary flow, signaling related to a current version and presence or absence of the at least one system information message by a plurality of application layer protocol entities;

receiving, from the plurality of application layer protocol entities, system information messages at the device from a shared framing application layer protocol from at least one of the plurality of application layer protocol entities; and reassembling the fragments to recover the parent system information message.

43. The processor of claim 42, wherein if the fragments comprise fragments expressed in a second language representation, said reassembling comprises reassembling the fragments within the second language representation.

44. The processor of claim 43, wherein if the fragments comprise fragments encoded within the second language representation, further comprising decoding the fragments to the first language representation.

45. The processor of claim 42, further comprising storing each fragment on the device, wherein a size of each fragment is selected based on a size of memory on the device.

46. A non-transitory machine-readable storage medium having stored thereon a program that, when executed, directs a machine to perform a method for sending system information messages expressed in a first language representation, associated with media directed to a device, the method comprising:

fragmenting at least one system information message into a plurality of fragments within the first language representation, wherein each fragment carries at least one root attribute of the system information message; and cyclically transporting the fragments in an ascending order to the device in one of a plurality of flows selected based on a content of the system information message;

delivering, in a primary flow, signaling related to a current version and presence or absence of the at least one system information message by a plurality of application layer protocol entities; and delivering, by the plurality of application layer protocol entities, system information messages to the device, wherein the device is configured to receive system information messages by a shared application layer framing protocol from at least one of the plurality of application layer protocol entities.

47. A non-transitory machine-readable medium having stored thereon a program that, when executed, directs a machine to perform a method for receiving system information associated with media directed to a device, the method comprising:

monitoring a primary flow for a version number of at least one system information flow message;

when a system information message version number changes, receiving fragments of a corresponding system information message, each fragment carrying at least one attribute of a parent system information message expressed in a first language representation;

receiving, in the primary flow, signaling related to a current version and presence or absence of the at least one system information message by a plurality of application layer protocol entities;

receiving, from the plurality of application layer protocol entities, system information messages at the device from a shared framing application layer protocol from at least one of the plurality of application layer protocol entities; and reassembling the fragments to recover the parent system information message.

48. A computer program product for sending system information messages expressed in a first language representation, associated with media directed to a device, the computer program product comprising:

a non-transitory processor-readable storage medium having instructions stored thereon, the instructions comprising:

at least one instruction for causing a computer to fragment at least one system information message into a plurality of fragments within the first language representation, wherein each fragment carries at least one root attribute of the system information message;

at least one instruction for cyclically transporting the fragments in an ascending order to the device in one of a plurality of flows selected based on a content of the system information message;

at least one instruction for delivering, in a primary flow, signaling related to a current version and presence or absence of the at least one system information message by a plurality of application layer protocol entities; and at least one instruction for delivering, by the plurality of application layer protocol entities, system information messages to the device, wherein the device is configured to receive system information messages by a shared application layer framing protocol from at least one of the plurality of application layer protocol entities.

49. The computer program product of claim 48, wherein the instructions further comprising at least one instruction for encoding at least one fragment into a second language representation.

50. The computer program product of claim 49, wherein the framing protocol is performing at least one of:
- fragmentation and reassembly of the system information messages;
- encoding and decoding of the system information messages;
- fragmentation and reassembly of encoded system information messages;
- fragmentation and reassembly of encoded system information fragments; and
- management of a transmitting and receiving of system information fragments.

51. The computer program product of claim 49, wherein the instructions further comprising at least one instruction for fragmenting at least one of the fragments within the second language representation.

52. The computer program product of claim 51, wherein said at least one instruction for encoding at least one fragment into the second language representation further comprises at least one instruction for encoding the fragments from XML representation into binary representation.

53. The computer program product of claim 48, wherein said at least one instruction for fragmenting at least one of the fragments within the second language representation further comprises at least one instruction for fragmenting the system information message if the system information message has a larger size than a predetermined limit.

54. The computer program product of claim 53, wherein the predetermined limit is determined based on at least one physical characteristic of the device.

55. The computer program product of claim 54, wherein the physical characteristic comprises available memory on the device.

56. The computer program product of claim 48, wherein the system information message is included in a media presentation guide flow that provides a schedule of media available for viewing.

57. The computer program product of claim 56, wherein the media presentation guide flow comprises a near term flow and a long term flow.

58. The computer program product of claim 57, wherein the system information message is included in a marketplace information flow that provides information for subscribing to packages of media.

59. A computer program product for receiving system information messages expressed in a first language representation, associated with media directed to a device, the computer program product comprising:
- a non-transitory processor-readable storage medium having instructions stored thereon, the instructions comprising:
  - at least one instruction for causing a computer to monitor a primary flow for a version number of at least one system information flow message;
  - at least one instruction for, when a system information message version number changes, receiving fragments a corresponding system information message, each fragment carrying at least one attribute of a parent system information message expressed in a first language representation;
  - at least one instruction for receiving, in the primary flow, signaling related to a current version and presence or absence of the at least one system information message by a plurality of application layer protocol entities;
  - at least one instruction for receiving, from the plurality of application layer protocol entities, system information messages at the device from a shared framing application layer protocol from at least one of the plurality of application layer protocol entities; and
  - at least one instruction for reassembling the fragments to recover the parent system information message.

60. The computer program product of claim 59, wherein if the fragments comprise fragments expressed in a second language representation, said at least one instruction for reassembling further comprises at least one instruction for reassembling the fragments within the second language representation.

61. The computer program product of claim 60, wherein if the fragments comprise fragments encoded within the second language representation, the instructions further comprising at least one instruction for decoding the fragments to the first language representation.

62. The computer program product of claim 59, wherein the instructions further comprising at least one instruction for storing each fragment on the device, and wherein a size of each fragment is selected based on a size of memory on the device.

* * * * *